UNITED STATES PATENT OFFICE.

EMIL LANDFRIED, OF MERAN, AUSTRIA-HUNGARY.

FILTER-CARTRIDGE FOR TOBACCO-PIPES, &c.

SPECIFICATION forming part of Letters Patent No. 656,649, dated August 28, 1900.

Application filed March 9, 1899. Renewed July 25, 1900. Serial No. 24,810. (No specimens.)

*To all whom it may concern:*

Be it known that I, EMIL LANDFRIED, a citizen of the German Empire, residing at Meran, Austria-Hungary, have invented certain new and useful Improvements in Filter-Cartridges for Tobacco-Pipes, Cigar-Holders, and the Like, of which the following is a specification.

This invention relates to improved means for absorbing nicotine, the object being to provide means capable of absorbing nicotine contained in tobacco-smoke, but no other aromatic matter of this smoke.

Comparatively-weak acids and salts having acid reactions when used for the purpose of repressing or absorbing the nicotine element in tobacco-smoke not only combine with the nicotine, but also with all basic and aromatic substances, thereby destroying the flavor of the smoke and defeating the end for which they are used, since no one will employ them with such a prospect in advance. I have discovered that the acid salts of molybdenum—such as the molybdates of ammonium, of soda, of potash, and of magnesia—combine chemically with nicotine to form insoluble compounds, but will not combine with basic substances forming or contributing to the aroma of the smoke. In carrying out my invention, therefore, I impregnate cartridges of any suitable absorbent material—such as wool, amianthus, wadding, or the like—with a saturated solution of acid salts of molybdenum, such as above recited, forming the characteristic feature of my improvement, and introduce the same into the smoke-passage of the pipe or cigar-holder.

The fact that these cartridges absorb nicotine, but do not attack the aroma, distinguishes them advantageously from smoke-filters heretofore used, which have generally been based upon either the employment of acids which absorb not only the nicotine, but also other basic aromatic matters contained in the smoke, or of chlorid of calcium or magnesia, which represent but mechanically-absorbing means.

I would have it understood that I do not restrict myself to any specific absorbent material or to the use of absorbent material at all, the peculiar and salient feature of my invention consisting in the employment of acid salts of molybdenum for absorbing or destroying nicotine and preserving all aroma.

Having thus described my invention, what I claim, and desire to secure by Letters Patent, is—

1. As a means of destroying the nicotine in tobacco-smoke, without attacking the aroma-forming substances, a charge containing acid salts of molybdenum, substantially as described.

2. The improved smoke-filter, consisting of a cartridge of absorbent material impregnated with acid salts of molybdenum, as set forth.

EMIL LANDFRIED.

Witnesses:
JOSEF FROCOCIS,
ANTON HASSLER.